(12) United States Patent
Bae et al.

(10) Patent No.: US 9,868,591 B2
(45) Date of Patent: Jan. 16, 2018

(54) AUTOMATED GUIDED VEHICLE

(71) Applicant: Kia Motors Corporation, Seoul (KR)

(72) Inventors: Sang Don Bae, Gwangju (KR); Gab Su Kim, Gwangju (KR); Sung Jin Chu, Gwangju (KR); Yeong Kyu Mok, Gyeonggi-do (KR)

(73) Assignee: Kia Motors Corporation, Seoul (KR)

( * ) Notice: Subject to any disclaimer, the term of this patent is extended or adjusted under 35 U.S.C. 154(b) by 0 days.

(21) Appl. No.: 15/258,814

(22) Filed: Sep. 7, 2016

(65) Prior Publication Data

US 2017/0144502 A1 May 25, 2017

(30) Foreign Application Priority Data

Nov. 23, 2015 (KR) ........................ 10-2015-0164322

(51) Int. Cl.
*B65G 1/04* (2006.01)
*B66F 9/06* (2006.01)
*B60G 1/04* (2006.01)
*B60G 17/015* (2006.01)
*B62D 21/11* (2006.01)

(52) U.S. Cl.
CPC ................ *B65G 1/04* (2013.01); *B60G 1/04* (2013.01); *B60G 17/015* (2013.01); *B62D 21/11* (2013.01); *B66F 9/063* (2013.01)

(58) Field of Classification Search
CPC combination set(s) only.
See application file for complete search history.

(56) References Cited

U.S. PATENT DOCUMENTS

| | | | | |
|---|---|---|---|---|
| 3,731,790 A | * | 5/1973 | Esser | B65G 1/065 198/751 |
| 4,926,544 A | | 5/1990 | Koyanagi et al. | |
| 5,344,276 A | * | 9/1994 | Juan | B66F 9/063 104/88.01 |
| 2007/0103107 A1 | * | 5/2007 | Hayashi | B60L 3/0038 318/466 |
| 2010/0078232 A1 | * | 4/2010 | Adachi | B66F 9/063 180/12 |
| 2010/0320010 A1 | * | 12/2010 | Bo | B65G 1/0414 180/41 |
| 2012/0006609 A1 | | 1/2012 | Doan et al. | |
| 2012/0197477 A1 | | 8/2012 | Colwell | |
| 2013/0008734 A1 | | 1/2013 | Swasey et al. | |

(Continued)

FOREIGN PATENT DOCUMENTS

DE 202013007279 U1 * 11/2013 ............. B66F 9/065
EP 0304942 A2 3/1989
(Continued)

*Primary Examiner* — Nicole T Verley
(74) *Attorney, Agent, or Firm* — Mintz Levin Cohn Ferris Glovsky and Popeo, P.C.; Peter F. Corless

(57) ABSTRACT

An automated guided vehicle is provided and includes a frame in which a driving wheel is accommodated and an actuator that is connected to lift and lower a first portion of the frame centered around a hinge part formed at a second portion of the frame. Only one side of the frame is lifted to lift the driving wheel from the floor, thus reducing capacity and power consumption of the driving motor, and a region for space utilization is increased by reducing a size by applying the driving motor.

9 Claims, 4 Drawing Sheets

(56) References Cited

U.S. PATENT DOCUMENTS

| | | |
|---|---|---|
| 2014/0244097 A1 | 8/2014 | Colwell |
| 2016/0167557 A1* | 6/2016 | Mecklinger ............ B66F 9/063 |
| | | 414/495 |
| 2016/0368710 A1* | 12/2016 | Ramankutty .......... B65G 1/065 |

FOREIGN PATENT DOCUMENTS

| | | |
|---|---|---|
| JP | H0732973 A | 2/1995 |
| JP | H07329973 A | 12/1995 |
| JP | 2013-252858 A | 12/2013 |
| KR | 20-0334624 Y1 | 11/2003 |
| KR | 10-2011-0094661 A | 8/2011 |
| KR | 2013-0099021 A | 9/2013 |
| KR | 10-2014-0088277 A | 7/2014 |
| KR | 2014-0111785 A | 9/2014 |
| KR | 10-1524414 B1 | 5/2015 |
| WO | 2011/090755 A2 | 7/2011 |
| WO | WO 2015080685 A1 * | 6/2015 ............ B66F 9/063 |

* cited by examiner

AUTOMATED GUIDED VEHICLE

CROSS-REFERENCE TO RELATED APPLICATION

This application is based on and claims the benefit of priority to Korean Patent Application No. 10-2015-0164322, filed on Nov. 23, 2015, in the Korean Intellectual Property Office, the disclosure of which is incorporated herein in its entirety by reference.

TECHNICAL YIELD

The present disclosure relates to an automated guided vehicle, and more particularly, to an automated guided vehicle in which a height of a driving wheel is automatically adjustable.

BACKGROUND

In general, in a vehicle manufacturing factory, tens of thousands of components are assembled through numerous welding and assembling processes during an entire mass-production process until a vehicle is manufactured. In the mass-production process, a vehicle body and relevant components are transferred to a working process by a transfer device, thus promoting process automation and effectively managing a working process.

In particular, during the mass-production process of a vehicle, an outfitting process includes assembling an engine, a transmission, a chassis module, and other components to an interior of a vehicle body. During the outfitting process, components supplied in synchronization with a particular cycle time using a conveyer or an automated guided vehicle are installed in a vehicle body introduced through a main hangar in each process line.

The automated guided vehicle (AGV) is a transfer unit that autonomously guides a component, or the like, which is used for the purpose of supplying components, or the like, or performing a transfer operation for stocking production-completed products, in an unmanned plant or in an automated production line. The AGV includes a frame for loading an article and a driving wheel. In general, the AGV is operated by a determined control program and moved along a guide rail laid on the floor of a site of a production line. Thus, the AGV may automatically perform an operation of delivering, transferring, and supplying components, and the like.

SUMMARY

The present disclosure provides an automated guided vehicle which may be applied in a narrow space and in which a driving wheel is separated from a ground by lifting one side of the automated guided vehicle. Technical subjects of the present disclosure that may be obtained in the present disclosure are not limited to the foregoing technical subjects and any other technical subjects not mentioned herein may be easily understood by a person skilled in the art from the present disclosure and accompanying drawings.

According to an exemplary embodiment of the present disclosure, an automated guided vehicle may include: a frame configured to allow a driving wheel to be accommodated therein; and an actuator connected to lift and lower a first portion of the frame centered about a hinge part formed at a second portion of the frame.

The actuator may include: a cam shaft configured to lift and lower a first portion of the frame; and a bearing disposed to face the cam shaft. A cam may be formed at the cam shaft and may come into contact with the bearing based on rotation of the cam shaft. The actuator may include a driving motor directly connected to the cam shaft to rotate the cam shaft on its axis. The bearing may be provided in plurality, and the plurality of bearings may face each other on both sides of the second portion of the frame.

The frame may include a driving wheel disposed on a lower surface thereof and an elastic member provided to allow the driving wheel to be tightly attached to a ground. The elastic member may be disposed between the hinge part and the bearing. Additionally, the elastic member may be provided in plurality. The elastic member may be disposed on both side walls of the base frame. The frame may include an accommodation portion formed on one surface thereof to allow a driving wheel to be installed therein. The bearing may be provided as a cam follower bearing.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
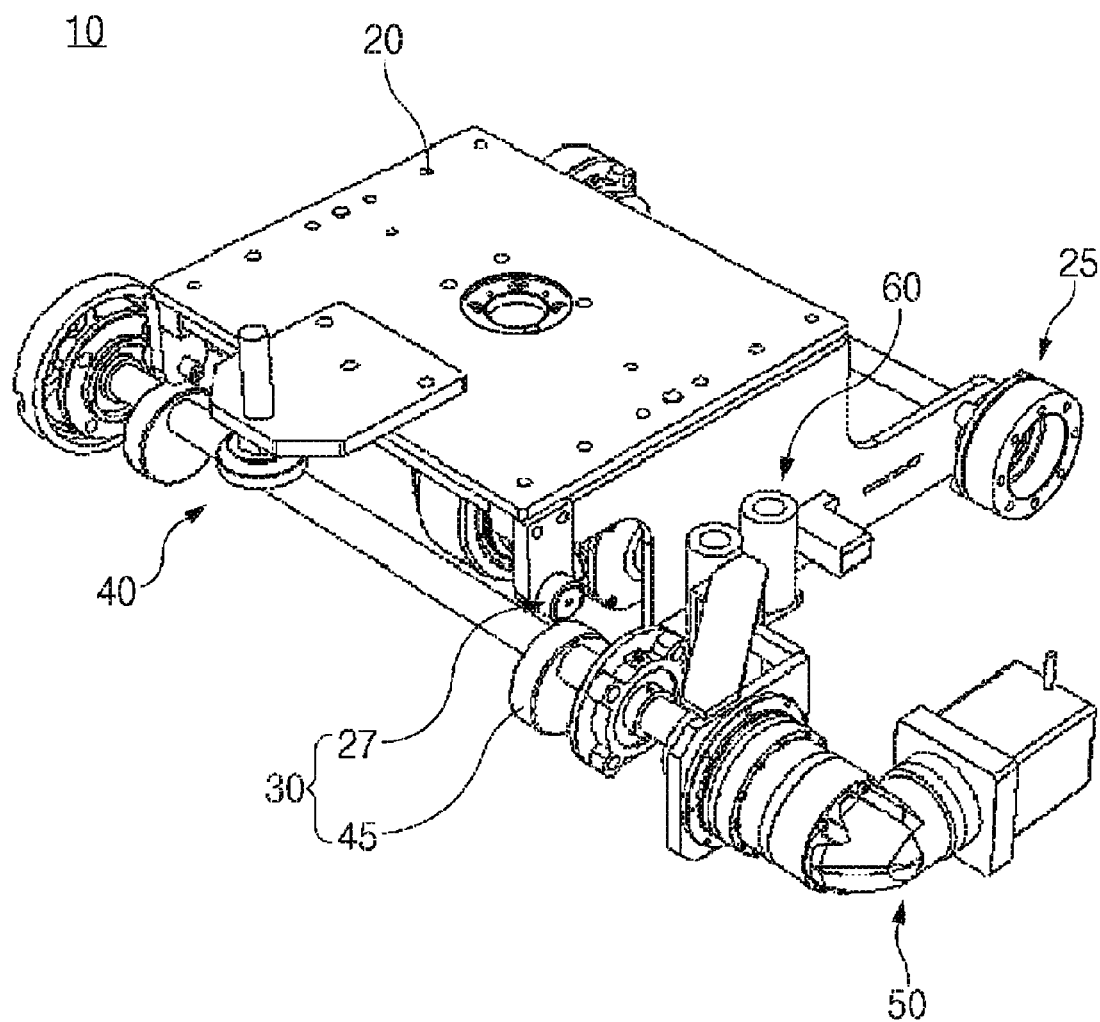
FIG. 1 is a perspective view illustrating an automated guided vehicle according to an exemplary embodiment of the present disclosure.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, combustion, plug-in hybrid electric vehicles, hydrogen-powered vehicles and other alternative fuel vehicles (e.g. fuels derived from resources other than petroleum).

Although exemplary embodiment is described as using a plurality of units to perform the exemplary process, it is understood that the exemplary processes may also be performed by one or plurality of modules. Additionally, it is understood that the term controller/control unit refers to a hardware device that includes a memory and a processor. The memory is configured to store the modules and the processor is specifically configured to execute said modules to perform one or more processes which are described further below.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/of" includes any and all combinations of one or more of the associated listed items.

Unless specifically stated or obvious from context, as used herein, the term "about" is understood as within a range of normal tolerance in the art, for example within 2 standard deviations of the mean. "About" can be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

Advantages, features, and methods for achieving the advantages and features of the present application will become more readily apparent from the detailed description given hereinafter. However, it should be understood that the detailed description and specific examples, while indicating exemplary embodiments of the invention, are given by way of illustration only, since various changes and modifications within the spirit and scope of the invention will become apparent to those skilled in the art from this detailed description. Like reference numerals designate like elements throughout the specification.

Hereinafter, an automated guided vehicle according to exemplary embodiments of the present disclosure will be described with reference to the accompanying drawings.

Figure 2:
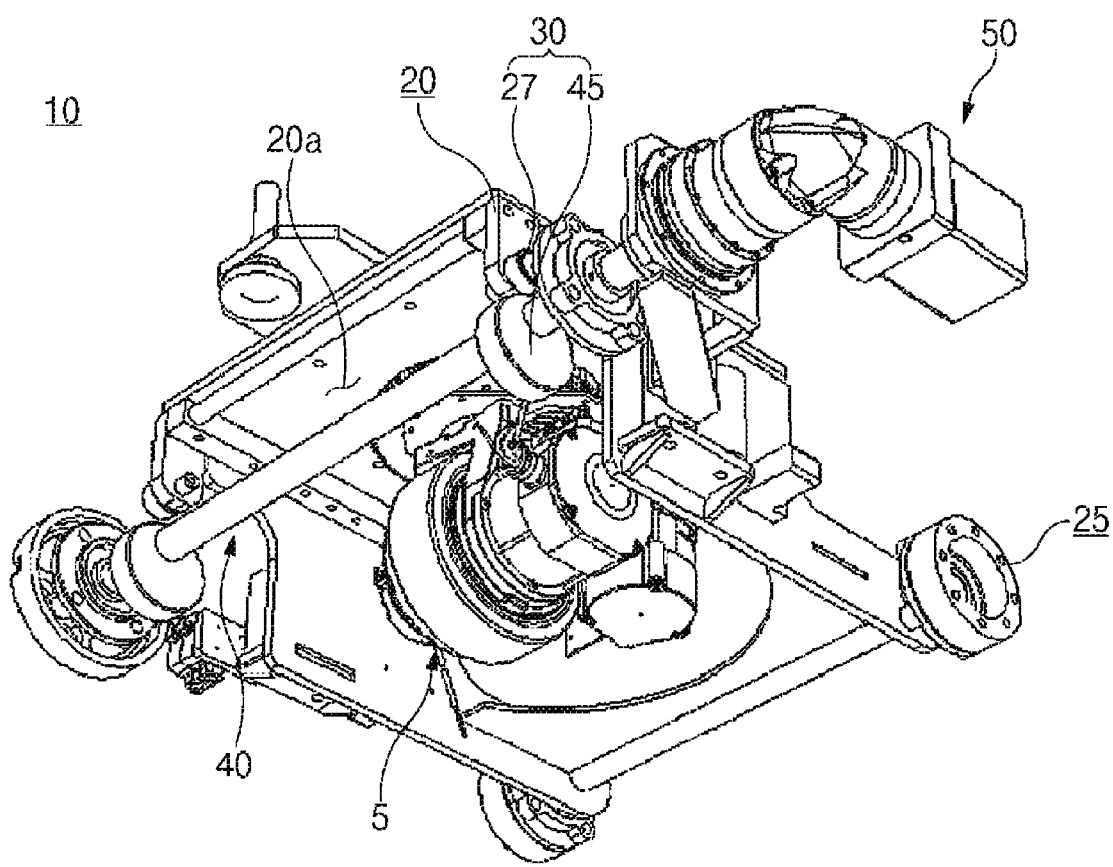
FIG. 2 is a perspective view illustrating an automated guided vehicle according to an exemplary embodiment of the present disclosure, viewed from below.

FIG. 1 is a perspective view illustrating an automated guided vehicle according to an exemplary embodiment of the present disclosure, FIG. 2 is a perspective view illustrating an automated guided vehicle according to an exemplary embodiment of the present disclosure, viewed from below, and FIGS. 3A-3B and 4A-4B are views illustrating operations of an automated guided vehicle according to an exemplary embodiment of the present disclosure. An automated guided vehicle may be modified by a person skilled in the art, and the present exemplary embodiment provides an automated guided vehicle.

Referring to FIGS. 1 and 2, the automated guided vehicle 10 according to an exemplary embodiment of the present disclosure may include a frame 20 configured to accommodate a driving wheel 5 therein and an actuator 30 configured to lift and lower the a first portion 22b of the frame 20 centered about a hinge part 25 formed at a second portion 22a of the frame 20.

The frame 20 forms a framework of the automated guided vehicle 10. The frame 20 may include the driving wheel 5, the hinge part 25 formed at the second portion 22a, a bearing 27 installed at the first portion 22b, and an elastic member 60 disposed between the hinge part 25 and the bearing 27. The frame 20 may have an accommodation portion 20a formed on a first side thereof facing a ground. The driving wheel 5 may be disposed in the accommodation portion 20a of the frame 20. The hinge part 25 may be formed at the second portion piece 22a of the frame 20, and the first portion 22b of the frame 20 may be rotated centered around the hinge part 25.

The bearing 27 may be mounted at the first portion 22b of the frame 20, and when the bearing 27 is rotated as a shaft by a cam 45 (to be described hereinafter), the first portion 22b of the frame 20 is lifted or lowered centered around the hinge part 25. The bearing 27 may be provided as a cam follower bearing. It is described that the bearing 27 protrudes to the side of the frame 20, but the bearing 27 may also be installed on an inner side of the frame 20 toward the accommodation portion 20a. The bearing 27 may be provided in plurality and disposed on both sides of the first portion 22b of the frame 20. The actuator 30 configured to lift and lower the first portion 22b may be formed at the frame 20.

In the actuator 30, the first portion 22b of the frame 20 may be formed to rotate centered around the hinge part 25 of the first portion 22a of the frame 20. In addition, in the actuator 30, the bearing 27 may be disposed to face a cam shaft 40 configured to lift and lower the first portion 22b of the frame 20. A cam 45 to be moved to be in contact with the bearing 27 may be formed at the cam shaft 40. When the cam shaft 40 is rotated based on an operation of the driving motor 50, the cam 45 may also be rotated on its axis. When the cam 45 comes into contact with the bearing 27 based on the rotation of the cam shaft 40, the bearing 27 may be rotated on its axis. Thus, the frame 20 may be lifted and lowered as the bearing 27 is supported by the cam 45. The cam 45 may be formed integrally in the cam shaft 40. Additionally, the cam 45 may be brought into contact with the bearing 27 based on the rotation of the cam shaft 40. The cam 45 spaced apart from the bearing 27 may come into surface-contact with the bearing 27. The cam 45 may further be configured to support the bearing 27.

In an exemplary embodiment of the present disclosure, it is described that the cam shaft 40 may be rotated in a clockwise direction, but the present disclosure is not limited thereto and the cam shaft 40 may be provided to rotate by 360 degrees. The cam shaft 40 may be directly connected to the driving motor 50 to thus rotate the cam shaft 40 on an axis thereof by the driving motor 50. The driving motor 50 may be directly connected to a first side of the cam shaft 40 to rotate the cam shaft 40. The driving motor 50 may be provided as a servo motor. Further, the driving motor 50 may be disposed toward the hinge part 25 on an outer side of the frame 20, minimizing the use of a space.

The driving wheel may be disposed on a lower surface of the frame 20 and an elastic member 60 may be disposed on the frame 20 to tightly attach (e.g., to secure) the driving wheel 5 to a ground. The elastic member 60 may be disposed between the hinge part 25 and the bearing 27. Here, it is described that the elastic member 60 may be provided as a suspension, but the present disclosure is not limited thereto. The elastic member 60 may be provided in plurality. The elastic member 60 may be disposed on both side walls of the frame 20 to be mounted thereon.

An operation of the automated guided vehicle according to an exemplary embodiment of the present disclosure configured as described above will be described. FIGS. 3A-3B and 4A-4B are views illustrating operations of an automated guided vehicle according to an exemplary embodiment of the present disclosure. The various components described herein below may be operated by a vehicle controller having a processor and a memory.

Figure 3A:
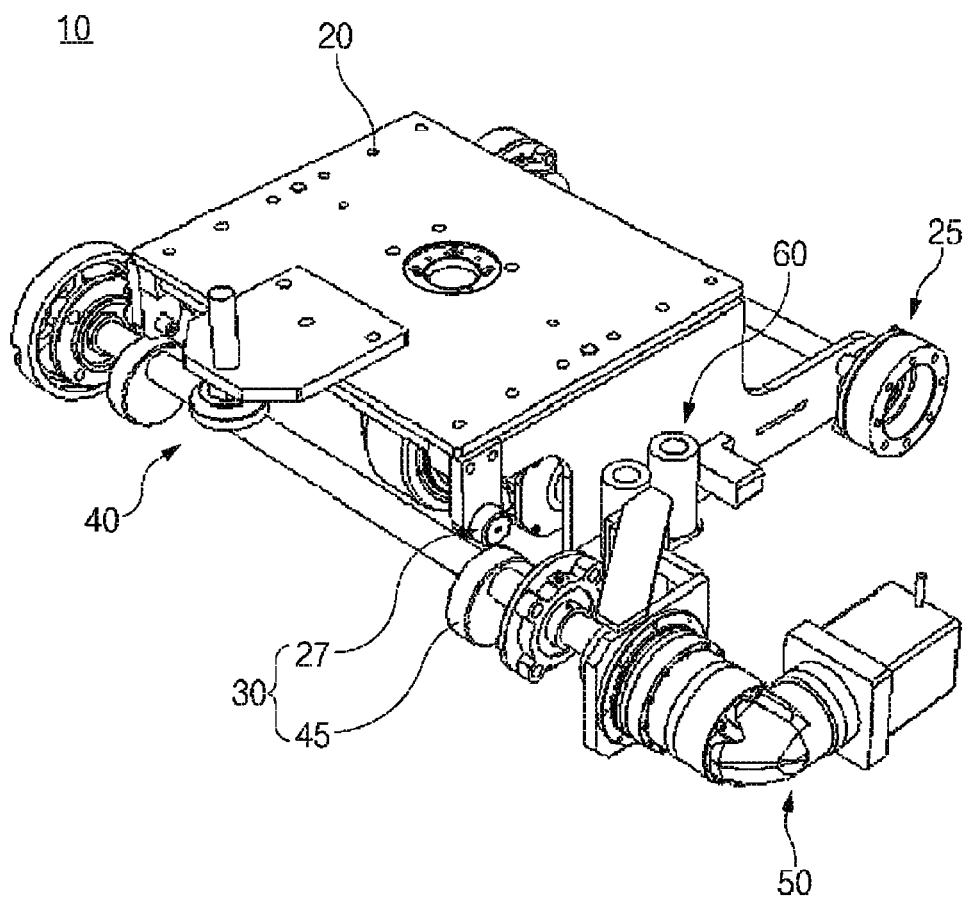
FIGS. 3A, 3B and 4A, 4B are views illustrating operations of an automated guided vehicle according to an exemplary embodiment of the present disclosure.
Figure 3B:
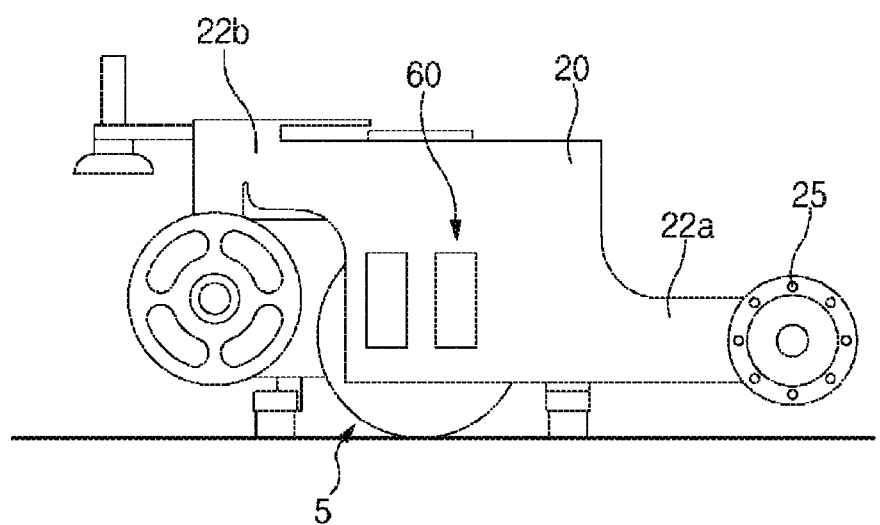
Figure 4A:
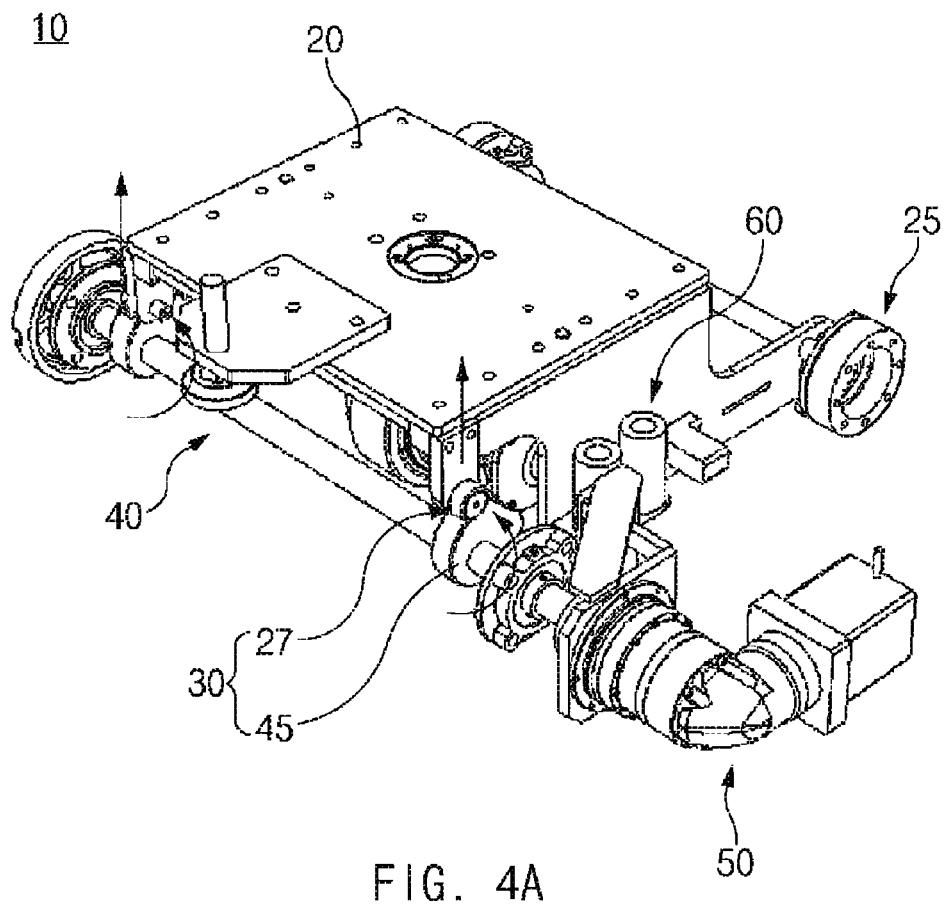
Figure 4B:
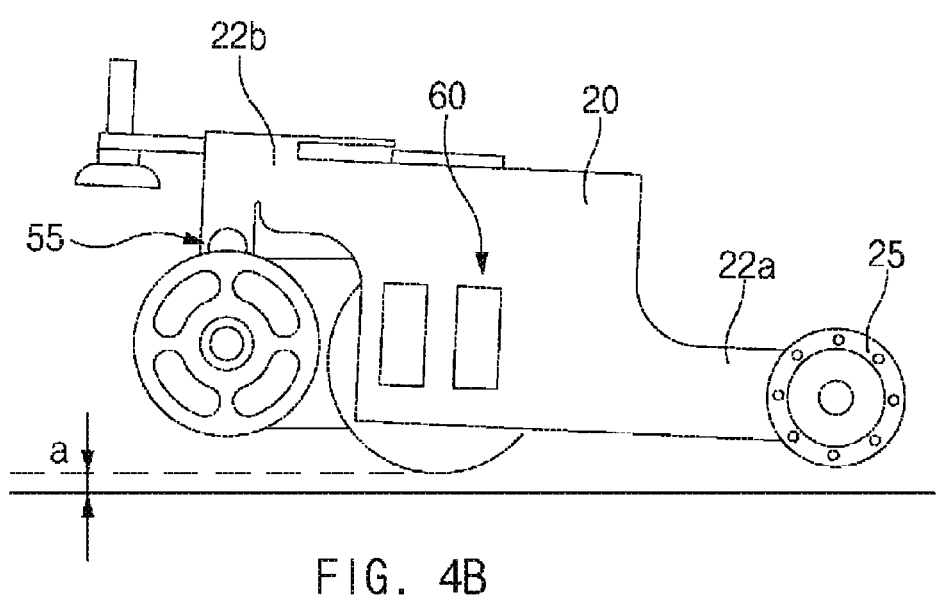

In particular, the automated guided vehicle according to an exemplary embodiment of the present disclosure will be described with reference to FIGS. 3A, 3B and 4A, 4B. FIG. 3A is a perspective view illustrating a state of the automated guided vehicle before being operated, and FIG. 3B is a front view illustrating the state of FIG. 3A. FIG. 4A is a perspective view illustrating an operated state of the automated guided vehicle, and FIG. 4B is a front view illustrating the state of FIG. 4A.

The bearing 27 of the frame 20 and the cam 45 of the cam shaft 45 may be spaced apart from each other. However, when the cam shaft 40 is rotated based on an operation of the driving motor 50, the cam 45 of the cam shaft 40 may be moved toward the bearing 27. Referring to FIGS. 4A and 4B, the cam 45 of the cam shaft 40 may come into contact with the bearing 27 and may be rotated based on an operation of the driving motor 50. In other words, as the cam shaft 40 is rotated in a clockwise direction, the cam 45 may be rotated together toward the bearing 27. In particular, the cam 45 may be in surface-contact with the bearing 27 to support the bearing 27. The bearing 27 may be rotated on its axis by the cam 45.

Thereafter, the driving wheel 5 may be set to be lifted to a height (a) at which the driving wheel 5 is separated from the ground in advance through a driving control program. Then, as the driving motor 50 operates, the bearing 27 may be rotated on its axis along the cam 45, and the first portion 22b of the frame 20 may be lifted by the cam 45. Particularly, the first portion 22b of the frame 20 may be rotated centered around the hinge part 25 at the second portion 22a of the frame 20. Accordingly, the first portion 22b of the frame 20 may be lifted based on a shape of the cam 45 (e.g., particular portions of the cam 45 may cause the frame 20 to be lifted and lowered) and the driving wheel 5 may be separated from the ground.

Meanwhile, when the frame 20 is intended to be returned to an original state, the driving motor 50 may be continuously operated and the bearing 27 may be moved along the cam 45. Additionally, the first portion 22b of the frame 20 may be lowered centered around the hinge part 25 to be returned to the original state. Thus, a height of a first side of the frame 20, that is, the first portion 22b of the frame 20, may be adjusted based on rotation of the cam shaft 40 by operating the driving motor 50, whereby only a first side of the frame 20 is lifted to lift the driving wheel 5 from the floor, thus reducing capacity and power consumption of the driving motor 50, and a region for space utilization may be increased by reducing a size by applying the driving motor 50.

As described above, the automated guided vehicle according to an exemplary embodiment of the present disclosure have the following advantages.

First, according to the automated guided vehicle of the present disclosure, since the driving wheel may be separated from the floor by lifting only one side of the frame, capacity and power consumption of the driving motor may be reduced.

Second, according to the automated guided vehicle of the present disclosure, a size may be reduced by applying the actuator connected to the driving motor, thus utilizing a space.

The advantages and effects of the present disclosure are not limited to the foregoing contents and any other technical effects not mentioned herein may be clearly understood by a person skilled in the art from the description of claims. As for the automated guided vehicle according to the present disclosure, the configuration and method according to the exemplary embodiments of the present disclosure described above are not limited in its application, but the entirety or a portion of the embodiments may be selectively combined to be configured into various modifications.

Hereinabove, although the present disclosure has been described with reference to exemplary embodiments and the accompanying drawings, the present disclosure is not limited thereto, but may be variously modified and altered by those skilled in the art to which the present disclosure pertains without departing from the spirit and scope of the present disclosure claimed in the following claims.

What is claimed is:

1. An automated guided vehicle, comprising: a frame configured to allow a driving wheel to be accommodated therein; and an actuator connected to lift and lower a first portion of the frame centered around a hinge part formed at a second portion of the frame; wherein the actuator includes: a cam shaft configured to lift and lower the first portion of the frame; and a bearing disposed to face the cam shaft; wherein a cam is mounted on the cam shaft and comes into contact with the bearing based on a rotation of the cam shaft; and wherein the actuator includes a driving motor directly connected to the cam shaft to rotate the cam shaft on an axis thereof.

2. The automated guided vehicle according to claim 1, wherein the bearing is provided in plurality, and the plurality of bearings face each other on both sides of the first portion of the frame.

3. The automated guided vehicle according to claim 1, wherein the frame includes the driving wheel disposed on a lower surface thereof and an elastic member provided to allow the driving wheel to be fixed to a ground.

4. The automated guided vehicle according to claim 3, wherein the elastic member is disposed between the hinge part and the bearing.

5. The automated guided vehicle according to claim 4, wherein the elastic member is provided in plurality.

6. The automated guided vehicle according to claim 2, wherein an elastic member is disposed on both side walls of a base frame of the frame.

7. The automated guided vehicle according to claim 1, wherein the frame includes an accommodation portion formed on one surface thereof to allow the driving wheel to be installed therein.

8. The automated guided vehicle according to claim 1, wherein the bearing is provided as a cam follower bearing.

9. An automated guided vehicle, comprising:
a frame configured to accommodate a driving wheel therein; and
a servo motor configured to lift and lower a first portion of the frame centered around a hinge part formed at a second portion of the frame,
wherein the frame is directly connected to a bearing mounted at the first portion of the frame and a cam shaft on which a cam is mounted and comes into contact with the bearing when the frame is lifted and lowered.

\* \* \* \* \*